United States Patent

Andreas et al.

[11] Patent Number: 6,094,616
[45] Date of Patent: Jul. 25, 2000

[54] METHOD FOR AUTOMATICALLY CONTROLLING MOTOR VEHICLE SPACING

[75] Inventors: Peter Andreas, Gifhorn; Wolfgang Bäker, Braunschweig; Thomas Ruchatz, Lehre, all of Germany

[73] Assignee: Volkswagen AG, Wolfsburg, Germany

[21] Appl. No.: 09/244,789

[22] Filed: Feb. 5, 1999

[30] Foreign Application Priority Data

Feb. 7, 1998 [DE] Germany ............... 198 04 944

[51] Int. Cl.⁷ ............................................. G06F 7/00
[52] U.S. Cl. .................. 701/96; 701/1; 701/23; 701/25; 701/200; 701/301; 342/104; 342/109; 340/435; 340/436; 340/903
[58] Field of Search .............. 701/96, 116, 200, 701/301, 1, 23, 25; 342/70, 71, 107, 109, 455, 104; 340/425.5, 435, 436, 901, 903, 904

[56] References Cited

U.S. PATENT DOCUMENTS

| | | | |
|---|---|---|---|
| 4,622,636 | 11/1986 | Tachibana | 701/96 |
| 5,014,200 | 5/1991 | Chundrlik et al. | 701/96 |
| 5,331,561 | 7/1994 | Barrett et al. | 701/96 |
| 5,369,590 | 11/1994 | Karasudani | 701/96 |

*Primary Examiner*—William A. Cuchlinski, Jr.
*Assistant Examiner*—Yonel Beaulieu
*Attorney, Agent, or Firm*—Baker Botts L.L.P.

[57] ABSTRACT

In the method for automatically controlling the spacing of motor vehicles described in the specification, a lane width for a controlled vehicle which is defined for evaluation is varied as a function of transverse velocities of vehicles detected ahead of the controlled vehicle.

4 Claims, 2 Drawing Sheets

METHOD FOR AUTOMATICALLY CONTROLLING MOTOR VEHICLE SPACING

BACKGROUND OF THE INVENTION

This invention relates to methods for automatically controlling the spacing of motor vehicles.

To enhance the safety of motor vehicles and drivers in present-day road traffic, in addition to using vehicle spacing traffic control systems, increased efforts are being made to assist the vehicle operator in routine procedures as well as in extraordinary situations by providing systems that automatically intervene in the control of the vehicle or of individual vehicle components. A first step in this direction has been the use of antilock braking systems (ABS) and antislip regulation (ASR) to improve the stability of the vehicle in dynamically critical situations in the direction of vehicle motion, i.e. in braking and acceleration of the vehicle. Further, use is made of so-called vehicle dynamics regulation (FDR) or stabilizing regulation (FSR) to enhance vehicle stability in dynamically critical situations in directions lateral to the direction of vehicle motion, i.e. especially in situations caused or influenced by turning of the steering wheel by the operator. An FDR system evaluates sensor data received from suitable sensors in individual vehicle components or from the vehicle as a whole and correlates them utilizing special evaluating algorithms. In this way it is possible to recognize transverse dynamically critical situations and, by applying a control to individual parameters of vehicle operation, for example the angular velocity and acceleration of the steering wheel, affect the vehicle positively in terms of the transverse dynamically critical situation.

Furthermore, arrangements for automatic distance regulation (ADR) have been developed by which the controlled vehicle automatically maintains a required safe distance from a vehicle in front. One such arrangement is disclosed in U.S. Pat. No. 5,629,851 which includes a distance sensing system, an evaluating unit, and a speed control servo device to be actuated by the evaluating unit. The distance sensing system may, for example, be a radar, lidar or electronic sensing system which scans for objects in the traffic space ahead of the vehicle. The scanning angle of the distance sensing system is chosen so that objects in adjacent traffic lanes are detected as well as objects in the same lane.

The data received by the distance sensing system are transmitted to the evaluating unit which also receives data representing the speed of the motor vehicle itself, so that the speed of the vehicle in front can be calculated. Since the safe distance to be maintained between the vehicles depends on the vehicle speed, the calculation is preferably based on a vehicle following time $t_f$ as a function of vehicle speed. If the speed of the controlled vehicle is greater than that of the vehicle in front, the following time $t_f$ decreases. If $t_f$ decreases to a predetermined valve, the evaluating unit supplies a signal to a servo device which controls the velocity of the controlled vehicle. The servo device may, for example, be the throttle flap, the fuel injection valve or the vehicle brake. This velocity control process ultimately causes the controlled motor vehicle to travel at the same speed as the motor vehicle in front.

In this process, the adjacent vehicle lanes are first checked for relevant vehicles. For example, if vehicles are detected as traveling in the opposite direction in an adjacent lane, then that lane carries traffic in the opposite direction and need not be considered. The determination of whether an object is located in the same lane or in an adjacent lane is made on the basis of a defined width for the lane containing the controlled vehicle. In addition, the evaluation unit ascertains, from the data received from the distance sensor system, the direction of lateral motion of vehicles in adjacent lanes. If a vehicle moves from an adjacent lane into the defined lane width for the lane of the controlled vehicle, the evaluating unit evaluates that object as a nearest vehicle, and regulates the controlled vehicle velocity downwardly so as to maintain the required following time $t_f$ with respect to that vehicle. Correspondingly, when the vehicle in front of the controlled vehicle departs from the defined lane width, the speed of the controlled vehicle is increased until a new vehicle is detected in the same lane, as to which the constant following time $t_f$ is then maintained.

A disadvantage of conventional methods of automatic distance control is that a very abrupt deceleration may sometimes be necessary especially in the case of a cut-in operation by another vehicle. A human motor vehicle operator, by contrast, generally drives with foresight, i.e. reacts very early to such a cut-in operation, thus reducing speed earlier, so that on the whole a continuous gradual deceleration ensures. One essential requirement for acceptance of automatic driver assistance arrangements is that they should not lead to an entirely different driving behavior.

SUMMARY OF THE INVENTION

Accordingly, it is an object of the present invention to provide a method for automatically controlling the spacing of motor vehicles that overcomes disadvantages of the prior art.

Another object of the invention is to provide a method for automatic control of vehicle spacing that will largely conform to the behavior of a human motor vehicle operator.

These and other objects of the invention are attained by providing a method in which a distance sensor determines the distance to vehicles in front of the controlled vehicle, a vehicle in the lane of the controlled vehicle, which has a defined width, is identified, and a predetermined following time from that vehicle is maintained, transverse velocities of vehicles in the lane of the controlled vehicle and in adjacent lanes are determined, and the defined lane width is altered as a function of the transverse velocities of the vehicles.

Because the defined lane width is varied as a function of the transverse velocities of the vehicles detected in the same lane and adjacent lanes, this method of automatic distance regulation responds in the same manner as a foresighted motor vehicle operator, since the automatic control takes account of a potential lane variation of the detected vehicles at an earlier time.

According to the invention, upon detection of a transverse velocity of a vehicle located in the same lane as the controlled vehicle, the lane width is reduced, since a cut-out of that vehicle away from the lane may be anticipated. As a result of the reduction of the defined lane width, the vehicle in front moving out of the lane will have departed from the lane earlier for purposes of distance regulation, so that a new vehicle to be followed in the same lane will be detected earlier as well. Hence the controlled vehicle will accelerate earlier and will continue to increase speed until the distance sensor arrangement detects a new vehicle in the same lane or else the speed limit selected by the operator is reached.

Correspondingly, upon detection of a transverse velocity of a vehicle located in an adjacent lane toward the lane of the controlled vehicle, a cut-in operation is anticipated and the defined lane width of the controlled vehicle is increased if the vehicle in the adjacent lane is closer than the vehicle ahead in the same lane so that the vehicle cutting into that lane will be evaluated sooner as being in the same lane and, accordingly, deceleration of the controlled vehicle may be effected sooner.

In another preferred embodiment, the adaptation of the defined lane width as a function of the magnitude of the transverse velocity and/or the relative velocity between the controlled vehicle and the other detected vehicle is dynamically adaptive so that, for example, a high transverse velocity of a vehicle cutting in will result in a correspondingly large reduction of the lane width.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
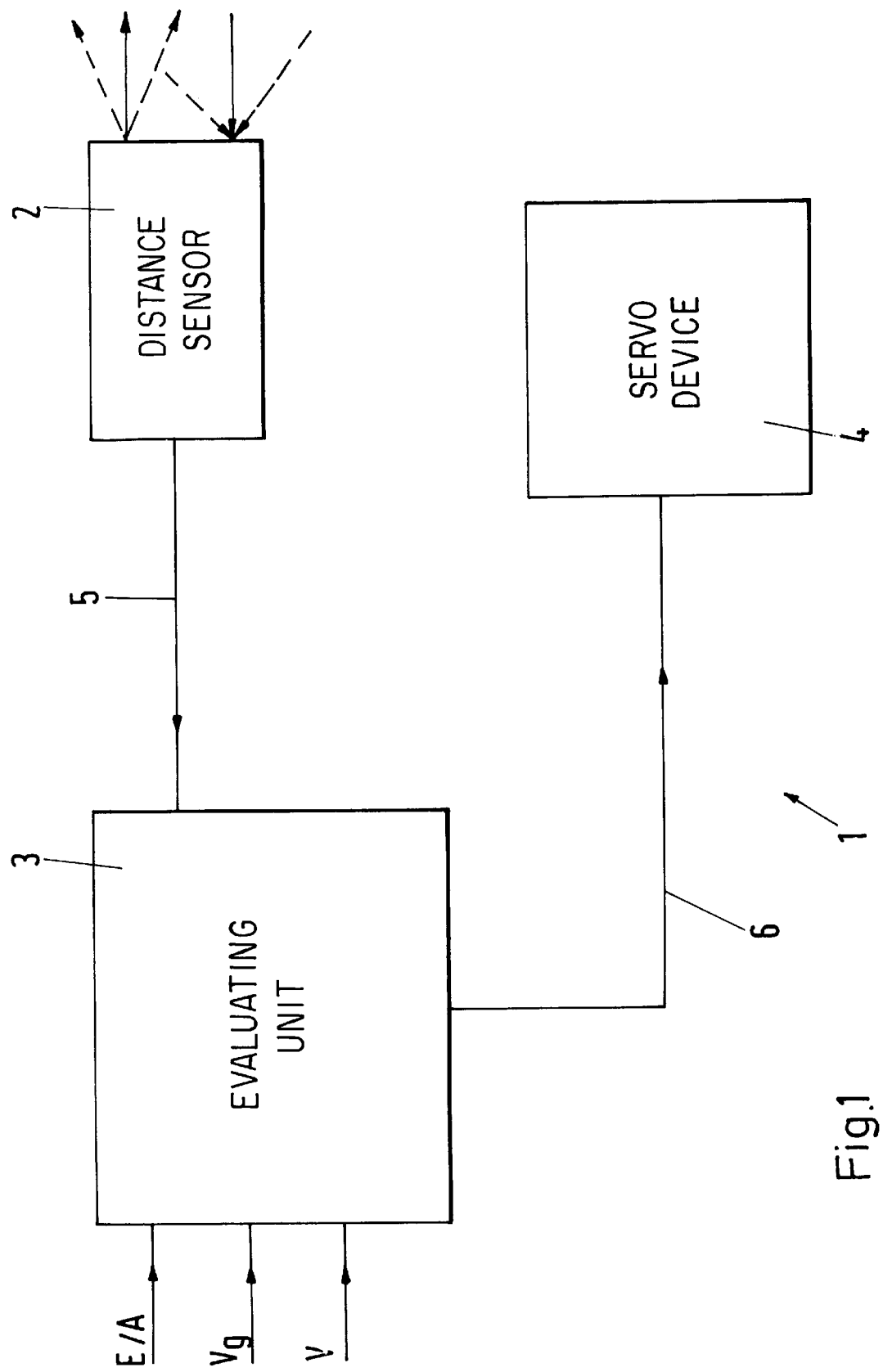
FIG. 1 is a schematic block diagram illustrating a representative embodiment of an arrangement for automatic distance regulation of motor vehicles.

In the typical embodiment shown in the drawings, an arrangement 1 for automatic spacing of motor vehicles includes a distance sensor 2, an evaluating unit 3 and at least one servo device 4 for influencing the speed of the controlled motor vehicle. The distance sensor 2 is connected to the evaluating unit 3 through a data line 5. Further, the evaluating unit 3 is supplied with an on/off signal E/A, a desired travel speed signal $V_g$, and a signal representing the current motor vehicle speed V. The evaluating unit 3 is connected to the servo device 4 by a control line 6.

To activate the spacing control arrangement, the motor vehicle operator transmits an on-signal and a desired travel speed signal $V_g$ to the evaluating unit 3. Through a control line not shown, the evaluating unit 3 activates the distance sensor 2, for example by closing a switch between a power supply and the distance sensor 2. The distance sensor 2 then scans the traffic space within a certain field of vision ahead of the controlled vehicle and receives signals reflected from vehicles within the field of vision, which are detected by transit time and angle. The reflected signals are transmitted to the evaluating unit by the data line 5 and evaluated. At the same time, the vehicles detected are classified according to whether they are located in the same lane or in adjacent lanes. For this purpose, a defined lane width is used, and the position of each detected vehicle is determined from the transit time and the angle. Furthermore, the relative velocity of each detected vehicle with respect to the controlled vehicle can be determined. Similarly, the transverse velocity of the detected vehicles can be determined from detected changes in position.

Figure 2:
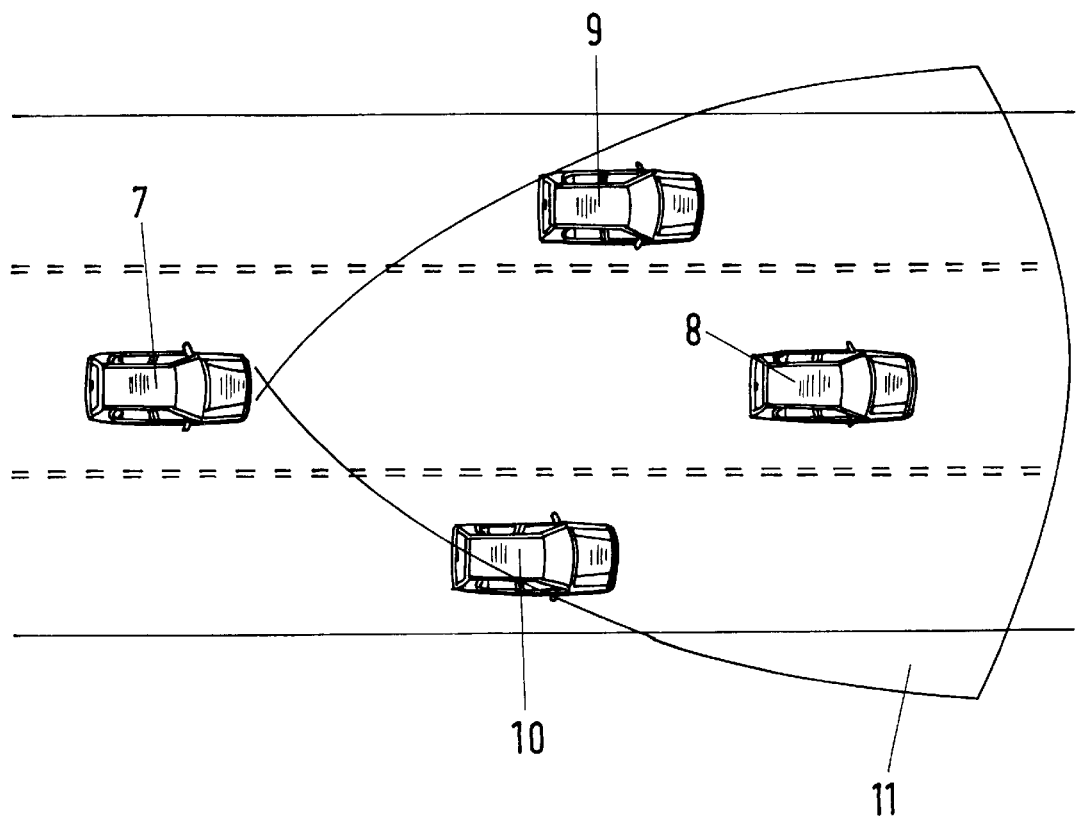
FIG. 2 is a schematic plan view illustrating an example of a traffic situation.

The process of vehicle spacing control will be described in detail in terms of the traffic situation represented in FIG. 2. A motor vehicle 7 having an automatic distance regulating device 1 is traveling in a central lane. In the same lane, there is another motor vehicle 8, and in each adjacent lane is another motor vehicle 9 and 10. The distance sensor 2 scans the traffic space ahead of the controlled vehicle over a certain field of vision 11 and detects the motor vehicles 8–10 with the field of vision. First, assume that the motor vehicles 9 and 10 are traveling straight ahead in their own lanes. If the motor vehicle 8 is traveling at a higher speed than the desired rate of travel $V_g$ set by the operator of the controlled vehicle 7, then the controlled vehicle will travel at the speed $V_g$, and the motor vehicle 8 moves further ahead. But if the vehicle 8 in front is traveling at a lower speed than $V_g$, then the controlled vehicle 7 approaches the vehicle 8. The evaluating unit 3 determines that the motor vehicle 8 is located within the defined lane width which is normally, for example, twice the width of a motor vehicle. If the distance between the vehicles 7 and 8 at the speed $V_g$ results in a following time less than a predetermined following time $t_f$, the evaluating unit 3 generates a signal for the servo device 4 so that the vehicle 7 decelerates until it follows the motor vehicle 8 at the same speed with a following time $t_f$.

If the evaluating unit 3 detects a transverse velocity of the motor vehicle 8, this is interpreted as a cutting-out maneuver, and the defined lane width is reduced. As a result, if the motor vehicle 8 continues moving toward the left or right lane, the evaluating unit 3 will classify the motor vehicle 8 earlier as being within the left lane or right lane. As soon as the vehicle 8 is seen as being within the right or the left lane, then there is no longer any vehicle immediately ahead of the controlled vehicle 7, and it will accelerate up to the travel speed $V_g$ unless another vehicle is meanwhile detected in the same lane. Hence, the reduction of defined lane width is also limited in time, so that once the vehicle 8 has disappeared from the lane, the traffic space will be scanned at the original lane width once more. The adaptation of lane width may be either at discrete time intervals or continuously dynamic.

However, if one of the motor vehicles 9 and 10 is moving laterally toward the lane of the controlled vehicle 7, the defined lane width is increased so as to include a portion of the adjacent lane. Consequently, the motor vehicle 9 or 10 will be classified earlier as being in the same lane as the controlled vehicle, and the speed of the vehicle ahead will be checked for maintenance of the required following time $t_f$. If the actual following time is less than the required following time $t_f$, the evaluating unit 3 generates a servo signal so that the controlled vehicle 7 decelerates earlier, even before the motor vehicle 9 or 10 is actually in the same lane.

If the two traffic situations just described occur simultaneously, the evaluating unit 3 determines the distance to each vehicle. If a motor vehicle 9 or 10 is cutting in between the vehicles 7 and 8, the defined lane width is increased. But if it cuts in ahead of the motor vehicle 8, the lane width is decreased. In this case however, the speeds of the vehicles may be taken into account as well. If, for example, the motor vehicle 10 is traveling at a lower speed than the vehicle 8 and moves to the left ahead of the vehicle 8, and at the same time the vehicle 8 changes to the left lane, the lane width is increased or kept the same since, because of the lower speed of the vehicle 10, the controlled vehicle 7 must be decelerated. But if the motor vehicle 10 cuts in at a higher speed, the lane width may be briefly decreased.

Although the invention has been described herein with reference to specific embodiments, many modifications and variations therein will readily occur to those skilled in the art. Accordingly, all such variations and modifications are included within the intended scope of the invention.

We claim:

1. A method for automatically controlling spacing from a vehicle in front by a controlled vehicle which has a distance sensor, an evaluating unit, and a servo device for controlling the velocity of the controlled vehicle in response to signals from the evaluating unit, comprising the following steps:

a) detecting objects located in the traffic space ahead of the controlled vehicle by the distance sensor in the controlled vehicle;
b) identifying a vehicle in front which is located within a defined lane width of the controlled vehicle in the evaluating unit in the controlled vehicle;
c) transmitting a signal from the evaluating unit to the servo device so that a preassigned following time $t_f$ of the controlled vehicle from the vehicle in front is maintained;
d) determining from data received by the evaluating unit from the distance sensor, a transverse velocity with respect to the lane of the controlled vehicle for each other vehicle detected inside or outside of the defined lane width; and
e) altering the defined lane width as a function of the transverse velocities detected.

2. A method according to claim 1 wherein the defined lane width is decreased upon detection of a transverse velocity of a vehicle in front located in the same lane.

3. A method according to claim 1 wherein the defined lane width is increased upon detection of a transverse velocity of a detected vehicle located in an adjacent lane in a direction toward the lane of the controlled vehicle provided that the detected vehicle is closer to the controlled vehicle than a vehicle in front which is located in the same lane as the controlled vehicle.

4. A method according to claim 1 wherein the variation of defined lane width is dynamically altered according to the magnitude of the transverse velocity and/or of the relative velocity between the controlled vehicle and the detected vehicles.

* * * * *